United States Patent
Meng et al.

(10) Patent No.: US 9,351,269 B2
(45) Date of Patent: May 24, 2016

(54) METHOD AND SYSTEM FOR PROCESSING SERVICE CONTINUITY

(71) Applicant: ZTE Corporation, Shenzhen (CN)

(72) Inventors: Lingcai Meng, Shenzhen (CN); Hongbing Pan, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/427,377

(22) PCT Filed: Sep. 25, 2013

(86) PCT No.: PCT/CN2013/084232
§ 371 (c)(1),
(2) Date: Mar. 11, 2015

(87) PCT Pub. No.: WO2014/048331
PCT Pub. Date: Apr. 3, 2014

(65) Prior Publication Data
US 2015/0230197 A1    Aug. 13, 2015

(30) Foreign Application Priority Data
Sep. 28, 2012 (CN) .......................... 2012 1 0370517

(51) Int. Cl.
| | |
|---|---|
| *H04W 4/00* | (2009.01) |
| *H04W 60/04* | (2009.01) |
| *H04W 76/02* | (2009.01) |
| *H04L 29/06* | (2006.01) |
| *H04W 8/04* | (2009.01) |
| *H04W 24/04* | (2009.01) |
| *H04W 40/24* | (2009.01) |

(52) U.S. Cl.
CPC ............ *H04W 60/04* (2013.01); *H04L 65/1006* (2013.01); *H04L 65/1016* (2013.01); *H04L 65/1083* (2013.01); *H04W 8/04* (2013.01); *H04W 24/04* (2013.01); *H04W 40/246* (2013.01); *H04W 76/02* (2013.01)

(58) Field of Classification Search
CPC ......... H04W 60/04; H04W 8/04; H04W 8/30; H04W 24/04; H04W 40/246; H04W 76/02; H04L 65/1006; H04L 65/1083
See application file for complete search history.

(56) References Cited

U.S. PATENT DOCUMENTS

| | | | |
|---|---|---|---|
| 8,374,173 B2* | 2/2013 | Sedlacek | H04W 60/005 370/352 |
| 2006/0258386 A1* | 11/2006 | Jeong | H04W 36/24 455/525 |

(Continued)

FOREIGN PATENT DOCUMENTS

| | | |
|---|---|---|
| CN | 101674313 A | 3/2010 |
| CN | 102448135 A | 5/2012 |
| CN | 102469438 A | 5/2012 |

OTHER PUBLICATIONS

International Search Report for corresponding application PCT/CN2013/084232 filed Sep. 25, 2013; Mail date Jan. 2, 2014.

*Primary Examiner* — Pakee Fang
(74) *Attorney, Agent, or Firm* — Cantor Colburn LLP (57) ABSTRACT

A method and system for processing service continuity are provided in the disclosure. The method comprises: a slave ATCF determines that a master ATCF is unavailable; the slave ATCF sends an allocated STN-SR to an SCC AS; the SCC AS sends an ATU-STI and a C-MSISDN to the slave ATCF according to the STN-SR; and the slave ATCF continues a service according to the STN-SR, the ATU-STI, and the C-MSISDN. Therefore, a problem in related art that how to recover a service as soon as possible when an exception occurs in the master ATCF is solved, so that an effect of rapidly continuing the service is achieved when an exception occurs in the master ATCF and there is no registration information of the UE.

18 Claims, 7 Drawing Sheets

(56) References Cited

U.S. PATENT DOCUMENTS

| | | | | |
|---|---|---|---|---|
| 2010/0029274 A1* | 2/2010 | Deshpande | ......... | H04J 11/0093 455/435.3 |
| 2011/0065433 A1* | 3/2011 | Iwamura | ........... | H04W 36/0088 455/434 |
| 2012/0120914 A1* | 5/2012 | Sedlacek | ............. | H04W 60/005 370/331 |
| 2014/0349694 A1* | 11/2014 | Raghothaman | ....... | H04W 36/00 455/509 |

* cited by examiner

METHOD AND SYSTEM FOR PROCESSING SERVICE CONTINUITY

TECHNICAL FIELD

The disclosure relates to the field of communications, including e.g., a method and system for processing service continuity.

BACKGROUND

An IP Multimedia Core Network Subsystem (referred to as IMS) is an IP-based network architecture proposed by the 3rd Generation Partnership Project (referred to as 3GPP), and it constructs an open and flexible service environment to support multimedia applications and provide the users with enriched multimedia services.

Figure 1:
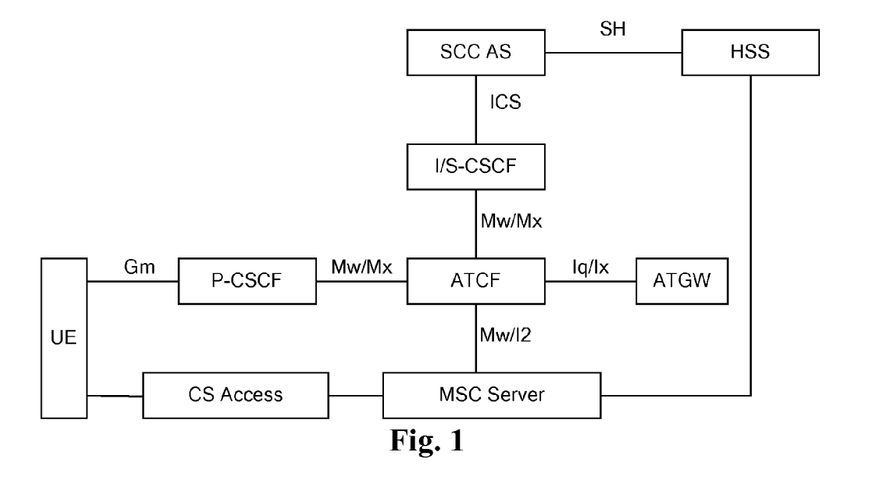
FIG. 1 shows a schematic diagram of an eSRVCC network element networking frame in related art.

The 3GPP standard organization studies on the Enhanced Single Radio Voice Call Continuity (referred to as eSRVCC), and publishes multiple standards, for example, an eSRVCC network element networking frame is stipulated in the standards such as the 3GPP TS 23.237 and the 3GPP TS 24.237. FIG. 1 shows a schematic diagram of an eSRVCC network element networking frame in related art. As shown in FIG. 1, in the eSRVCC technology, the function of an Access Transfer Control Function (referred to as ATCF) is very important. Several important parameters involved in the ATCF in this figure and the functions thereof are described as follows:

A Session Transfer Number-Single Radio (referred to as STN-SR) is allocated by the ATCF and is used for identifying an ATCF network element. A Mobile Switch Centre Server (referred to as MSC server) sends a switch request to a correct ATCF according to the STN-SR.

An Access Transfer Update-Session Transfer Identifier (referred to as ATU-STI) is allocated by a Service Continuity and Centralization Application Server (referred to as SCC AS) and is notified to the ATCF, used for filling an Uniform Resource Identifier (referred to as URI) of an invite message (also called request URI) in a request that the ATCF initiates call switch to the SCC AS.

A Correlation-Mobile Subscriber International Intergrated Service Digital Network (ISDN) Number (referred to as C-MSISDN) is acquired by the SCC AS from a Home Subscriber Server (referred to as HSS) and is notified to the ATCF, used for achieving the correlation of a Packet Switch (referred to as PS) call and a Circuit Switch (referred to as CS) call in the call switch.

The above-mentioned parameters are all allocated and acquired after a User Equipment (referred to as UE) is registered. If the UE does not initiate the registration, there is no such information about the UE on the ATCF and the SCC AS. The processing technology in the related art of the above-mentioned parameter information about the UE is described below.

The UE having the eSRVCC capability initiates the registration to an IMS domain. After a registration message arrives at the ATCF, the ATCF allocates the STN-SR to be filled in the 'Feature-Caps' header of the registration message and sends to an Interrogating Call Session Control Function (referred to as I-CSCF). After the UE is registered successfully on the CSCF, a host name or address of a Serving Call Session Control Function (referred to as S-CSCF) for serving the subscriber is returned and the ATCF stores the relevant data which is registered and returned. Meanwhile, the CSCF sends the STN-SR to the SCC AS via a third party registration flow. The SCC AS initiates a process of updating the STN-SR to the HSS, and notifies the ATCF of the C-MSISDN acquired from the HSS and the allocated ATU-STI via the Message message. The ATCF stores these data. After the UE is successfully registered, the ATCF provides the services of in-call, out-call, call/media anchoring and switch from a PS domain to a CS domain for the UE.

Figure 2:
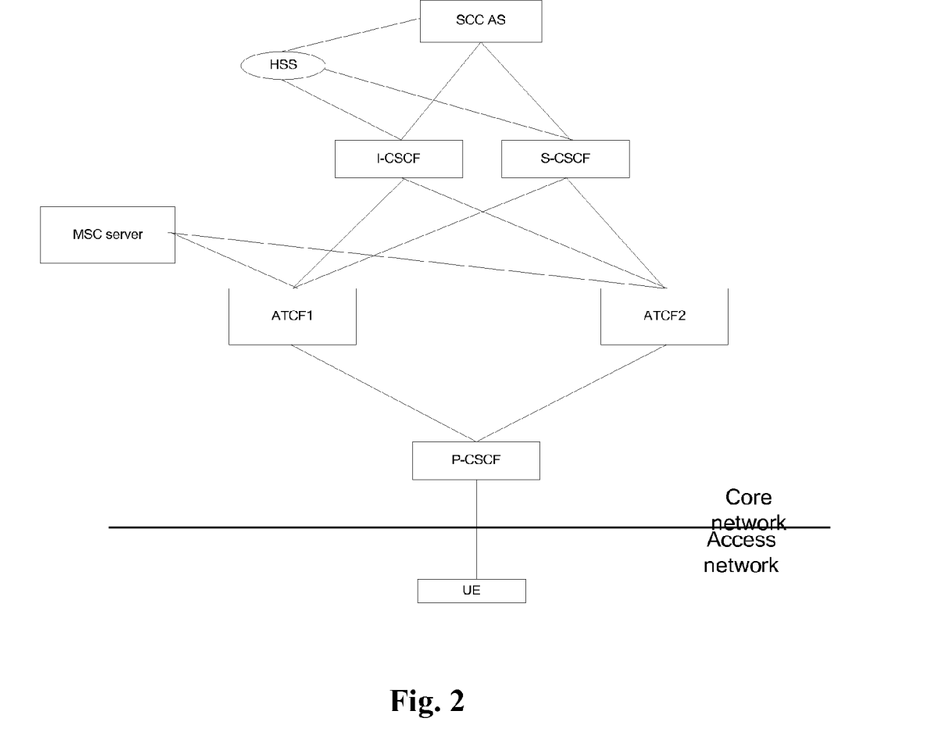
FIG. 2 shows a schematic diagram of a typical eSRVCC disaster recovery networking manner according to an embodiment of the disclosure.
Figure 3:
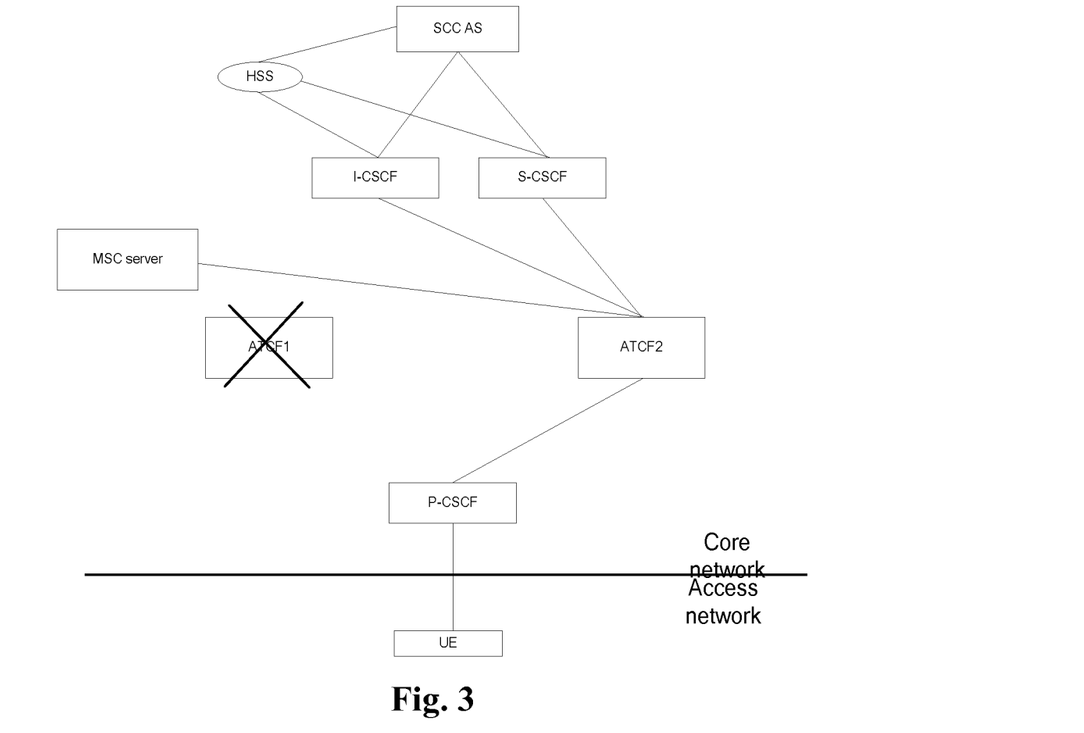
FIG. 3 shows a schematic diagram of an eSRVCC network element networking after the disaster recovery of a master ATCF according to an embodiment of the disclosure.

FIG. 2 shows a schematic diagram of a typical eSRVCC disaster recovery networking manner according to an embodiment of the disclosure. As shown in FIG. 2, the ATCF network element networks by means of disaster recovery and there is at least one pair of ATCF network elements. FIG. 3 shows a schematic diagram of an eSRVCC network element networking after the disaster recovery of a master ATCF according to an embodiment of the disclosure. As shown in FIG. 3, an ATCF1 (a master ATCF) has a breakdown, and the adjacent network elements have detected that the link between the network elements is interrupted. Thus, the UE needs to re-initiate the registration to a slave ATCF. After acquiring the above-mentioned relevant data which is registered and returned, the slave ATCF network element taken over by the disaster recovery provides for the normal call and switch services. However, when the UE re-registers, it needs to spend a certain period of time. During this period of time, the UE cannot carry out the normal services, thereby influencing user experience.

Therefore, there is a problem in the related art that how to recover a service as soon as possible when there is a breakdown on the master ATCF.

SUMMARY

A method and system for processing service continuity is provided in the embodiment of the disclosure, so at least to solve a problem in related art that how to recover a service as soon as possible when there is a breakdown on the master ATCF.

According to one aspect of the disclosure, a method for processing a service continuity is provided, which comprises: determining, by a slave Access Transfer Control Function (ATCF), that a master ATCF is unavailable; sending, by the slave ATCF, an allocated Session Transfer Number-Single Radio (STN-SR) to a Service Continuity and Centralization Application Server (SCC AS); sending, by the SCC AS, an Access Transfer Update-Session Transfer Identifier (ATU-STI) and a Correlation-Mobile Subscriber International Intergrated Service Digital Network (ISDN) Number (C-MSISDN) to the slave ATCF according to the STN-SR; and continuing, by the slave ATCF, a service according to the STN-SR, the ATU-STI, and the C-MSISDN.

According to an embodiment of the disclosure, before determining, by the slave ATCF, that the master ATCF is unavailable, the method further comprises: after a Proxy Call Session Control Function (P-CSCF) determines that the master ATCF of a service route which is registered and returned previously is unavailable, acquiring an address of the slave ATCF by means of querying Domain Name System (DNS) or local configuration; and sending, by the P-CSCF, a first request message to the slave ATCF according to the address of the slave ATCF, wherein as an alternative configuration, the P-CSCF extends a disaster recovery indication in the first request message; and/or, a route header of the first request message carries a host name or address of a Serving Call Session Control Function (S-CSCF).

According to an embodiment of the disclosure, determining, by the slave ATCF, that the master ATCF is unavailable by at least one of the following means: determining, by the slave ATCF, that the master ATCF is unavailable according to a case that there is no registration information of a current subscriber locally; and determining, by the slave ATCF, that the master ATCF is unavailable according to received disaster recovery indication information.

According to an embodiment of the disclosure, sending, by the slave ATCF, the allocated STN-SR to the SCC AS comprises: sending, by the slave ATCF, a message carrying the STN-SR to a Serving Call Session Control Function (S-CSCF); and sending, by the S-CSCF, the received message carrying the STN-SR to the SCC AS.

According to an embodiment of the disclosure, sending, by the slave ATCF, a message carrying the STN-SR to the S-CSCF comprises: sending, by the slave ATCF, an extended first Session Initiation protocol SIP message to an Interrogating Call Session Control Function (I-CSCF), wherein an extension field of the extended first SIP message carries the STN-SR; the I-CSCF queries a Home Subscriber Server (HSS) to acquire the S-CSCF; and the I-CSCF sends the first SIP message carrying the STN-SR to the S-CSCF; or sending, by the slave ATCF, a first SIP message from a Proxy Call Session Control Function (P-CSCF) to the S-CSCF, wherein the first SIP message carries the STN-SR, and a route header of the first SIP message carries a host name or address of the S-CSCF.

According to an embodiment of the disclosure, before determining, by the slave ATCF, that the master ATCF is unavailable, the method further comprises: after a Serving Call Session Control Function (S-CSCF) determines that the master ATCF is unavailable via link detection, acquiring an address of the slave ATCF by querying a Domain Name System (DNS) or according to a local configuration; and sending, by the S-CSCF, a second request message to the slave ATCF according to the address of the slave ATCF, wherein as an alternative configuration, the S-CSCF extends a disaster recovery indication in the second request message; and/or, a router header of the second request message carries a host name or address of a Proxy Call Session Control Function (P-CSCF).

According to an embodiment of the disclosure, before or after sending, by the SCC AS, the ATU-STI and the C-MSISDN to the slave ATCF according to the STN-SR, the method further comprises: initiating, by the SCC AS, an STN-SR update to the Home Subscriber Server (HSS); and initiating, by the HSS, the STN-SR update to a Mobile Management Entity (MME).

According to an embodiment of the disclosure, sending, by the SCC AS, the ATU-STI and the C-MSISDN to the slave ATCF according to the STN-SR comprises: sending, by the SCC AS, an extended second Session Initiation protocol SIP message to the S-CSCF, wherein the extended second SIP message carries the ATU-STI and the C-MSISDN; or sending, by the SCC AS, the ATU-STI and the C-MSISDN to the S-CSCF via a predefined message.

According to an embodiment of the disclosure, continuing, by the slave ATCF, a service according to the STN-SR, the ATU-STI, and the C-MSISDN comprises at least one of the following: continuing, by the slave ATCF, a service that a User Equipment (UE) initiates a call according to the STN-SR, the ATU-STI, and the C-MSISDN; continuing, by the slave ATCF, a service that the UE receives a call according to the STN-SR, the ATU-STI, and the C-MSISDN; and continuing, by the slave ATCF, a service that the UE performs call switching according to the STN-SR, the ATU-STI, and the C-MSISDN parameters.

According to another aspect of the disclosure, a system for processing service continuity is provided, which comprises: a slave Access Transfer Control Function (ATCF), configured to, after it is determined that a master ATCF is unavailable, send an allocated Session Transfer Number-Single Radio (STN-SR) to a Service Continuity And Centralization Application Server (SCC AS); the SCC AS, configured to send an Access Transfer Update-Session Transfer Identifier (ATU-STI) and a Correlation-Mobile Subscriber International Intergrated Service Digital Network (ISDN Number (C-MSISDN) to the slave ATCF according to the STN-SR; and the slave ATCF, further configured to continue a service according to the STN-SR, the ATU-STI, and the C-MSISDN.

According to an embodiment of the disclosure, the system further comprises a Proxy Call Session Control Function (P-CSCF) and the P-CSCF comprises a first acquiring component and a first sending component: the first acquiring component, configured to, after it is determined that the master ATCF of a service route which is registered and returned previously is unavailable, acquire an address of the slave ATCF by means of querying Domain Name System (DNS) or local configuration; and the first sending component, configured to send a first request message to the slave ATCF according to the address of the slave ATCF, wherein as an alternative configuration, the P-CSCF extends a disaster recovery indication in the first request message; and/or, a route header of the first request message carries a host name or address of a Serving Call Session Control Function (S-CSCF).

According to an embodiment of the disclosure, the system further comprises: the slave ATCF, further configured to send a message carrying the STN-SR to a Serving Call Session Control Function (S-CSCF); and the S-CSCF, configured to send the received message carrying the STN-SR to the SCC AS.

According to an embodiment of the disclosure, the system further comprises a Serving Call Session Control Function (S-CSCF) and the S-CSCF comprises a second acquiring component and a second sending component: the second acquiring component, configured to, after it is determined that the master ATCF is unavailable via link detection, acquire an address of the slave ATCF by querying a Domain Name System (DNS) or according to a local configuration; and the second sending component, configured to send a second request message to the slave ATCF according to the address of the slave ATCF, wherein as an alternative configuration, the S-CSCF extends a disaster recovery indication in the second request message; and/or, a route header of the second request message carries a host name or address of a Proxy Call Session Control Function (P-CSCF).

According to an embodiment of the disclosure, the system further comprises: the SCC AS, further configured to initiate an STN-SR update to the Home Subscriber Server (HSS); and the HSS, configured to initiate the STN-SR update to an MME.

By virtue of the disclosure, a slave ATCF determines that a master ATCF is unavailable; the slave ATCF sends an allocated STN-SR to an SCC AS; the SCC AS sends an ATU-STI and a C-MSISDN to the slave ATCF according to the STN-SR; and the slave ATCF continues a service according to the STN-SR, the ATU-STI, and the C-MSISDN. Therefore, a problem in related art that how to recover a service as soon as possible when there is a breakdown on the master ATCF is solved, so that an effect of rapidly continuing the service is achieved when there is a breakdown on the master ATCF and there is no registration information about the UE.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the present application and the features of the embodiments can be combined with each other if there is no conflict.

Figure 4:
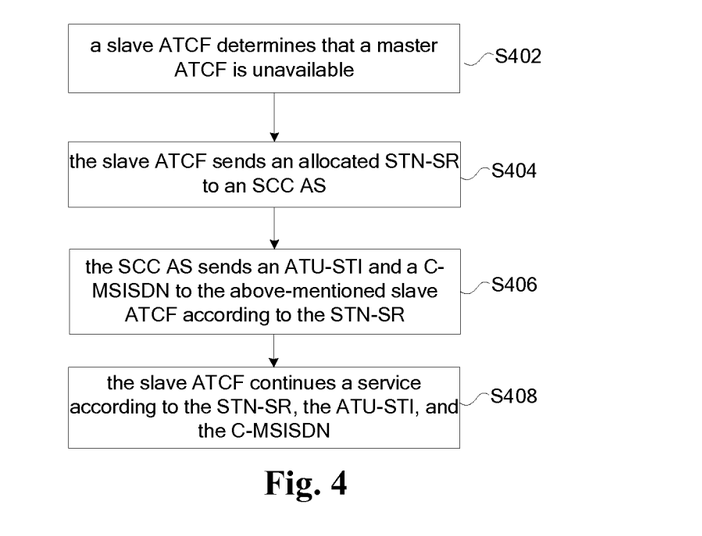
FIG. 4 shows a flowchart of a method for processing service continuity according to an embodiment of the disclosure.

In the present embodiment, a method for processing service continuity is provided. FIG. 4 shows a flowchart of a method for processing service continuity according to an embodiment of the disclosure. As shown in FIG. 4, the flow comprises the following steps:

Step S402, a slave ATCF determines that a master ATCF is unavailable;

Step S404, the slave ATCF sends an allocated STN-SR to an SCC AS;

Step S406, the SCC AS sends an ATU-STI and a C-MSISDN to the above-mentioned slave ATCF according to the STN-SR; and Step S408, the slave ATCF continues a service according to the STN-SR, the ATU-STI, and the C-MSISDN.

By virtue of the above-mentioned steps, after the slave ATCF determines that the master ATCF is unavailable, the slave ATCF acquires the parameters required when the slave ATCF processes a service through the interaction with other usable networks. With respect to the related art of processing a service only after the UE is re-registered and the information about the registration of the UE is acquired, thus not only solving a problem in the related art that the re-registration of the UE needs time delay, which influences the service processing and results in poor user experience, but also achieving an effect of rapidly continuing the service when there is a breakdown on the master ATCF and there is no registration information about the UE and improving the user experience to some extent.

Before the slave ATCF determines that the master ATCF is unavailable, as regards a P-CSCF), the following process is further comprised: after it is determined that the master ATCF of a service route which is registered and returned previously is unavailable, the P-CSCF acquires an address of the slave ATCF by means of querying a DNS or local configuration; and the P-CSCF sends a first request message to the slave ATCF according to the address of the above-mentioned slave ATCF, wherein as an alternative configuration, the P-CSCF can extend a disaster recovery indication in a first request message, and/or, a route header of the first request message carries a host name or address of an S-CSCF.

There can be various ways for the slave ATCF to determine that the master ATCF is unavailable, for example, the slave ATCF can determine that the master ATCF is unavailable by at least one of the following means: the slave ATCF determines that the master ATCF is unavailable according a case that there is no registration information about a current subscriber locally; and the slave ATCF can also determine that the master ATCF is unavailable according to received disaster recovery indication information. The way for determining can be selected flexibly for the convenience.

When the slave ATCF sends the allocated STN-SR to the SCC AS, the following process can also be used: the slave ATCF sends a message carrying the STN-SR to an S-CSCF; and the S-CSCF sends the received message carrying the STN-SR to the SCC AS. Furthermore, there can also be various ways for the slave ATCF sending the message carrying the STN-SR to the S-CSCF, for example, the slave ATCF sends an extended first SIP message to an I-CSCF, wherein an extension field of the extended first SIP message carries the STN-SR; the I-CSCF queries an HSS to acquire the S-CSCF; and the I-CSCF sends the first SIP message carrying the above-mentioned STN-SR to the S-CSCF. For another example, the slave ATCF sends a first SIP message from a P-CSCF to the S-CSCF, wherein a route header of the first SIP message carries a host name or address of the S-CSCF and the first SIP message carries the above-mentioned STN-SR. Certainly, the above-mentioned two ways can also be combined to be operated.

Before the slave ATCF determines that the master ATCF is unavailable, as regards an S-CSCF, the following process is further comprised: after it is determined that the master ATCF is unavailable via link detection, the S-CSCF acquires an address of the slave ATCF by querying a DNS or according to a local configuration; and the S-CSCF sends a second request message to the above-mentioned slave ATCF according to the address of the slave ATCF, wherein as an alternative configuration, the S-CSCF extends a disaster recovery indication in the second request message, and/or, a router header of the second request message carries a host name or address of a P-CSCF.

According to an embodiment of the disclosure, before or after the sending, by the SCC AS, the ATU-STI and the C-MSISDN to the slave ATCF according to the STN-SR, the method further comprises: the SCC AS initiates an update to an HSS; and the HSS initiates an STN-SR update to an MME. That is to say, there is no obvious time sequence between the SCC AS sending the ATU-STI and the C-MSISDN to the slave ATCF and the SCC AS sending the update to the HSS and the MME.

There can be various ways for the SCC AS to send the ATU-STI and the C-MSISDN to the above-mentioned slave ATCF according to the STN-SR, for example, the SCC AS can send an extended second SIP message to the S-CSCF, wherein the extended second SIP message carries the ATU-STI and the C-MSISDN. For another example, the SCC AS can also send the ATU-STI and the C-MSISDN to the S-CSCF via a predefined message, wherein the predefined message can be selected flexibly according to particular requirements, for example, can be a Message message, etc.

It should be noted that there can be various cases for the slave ATCF continuing services according to the STN-SR, the ATU-STI, and the C-MSISDN, for example, the slave ATCF continues a service that a UE initiates a call according to the STN-SR, the ATU-STI, and the C-MSISDN; the slave ATCF continues a service that the UE receives a call according to the STN-SR, the ATU-STI, and the C-MSISDN; and the slave ATCF continues a service that the UE performs call switching according to the STN-SR, the ATU-STI, and the C-MSISDN parameters. Of course, it is not limited to the cases listed above.

In the present embodiment, a system for processing service continuity is further provided, and the system is used to achieve the above-mentioned embodiments and preferred embodiments, thereby needing no further description for the embodiments that have been described. As used in the following, the term "component" can achieve a combination with a predefined function of software and/or hardware. Although the system described in the following embodiments is achieved better by using software, hardware or a combination of software and hardware is achievable and is conceived.

Figure 5:
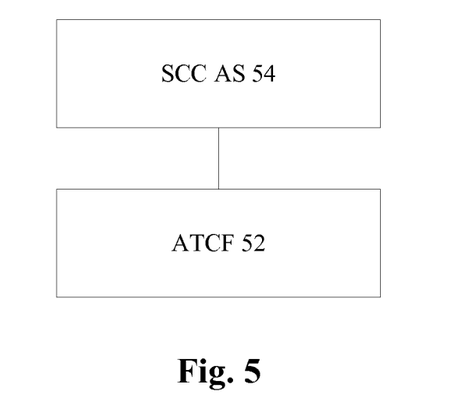
FIG. 5 shows a structure diagram of a system for processing service continuity according to an embodiment of the disclosure.

FIG. 5 shows a structure diagram of a system for processing service continuity according to an embodiment of the disclosure. As shown in FIG. 5, the system includes a slave ATCF 52 and an SCC AS 54, and the system is described below.

The slave ATCF 52 is configured to, after it is determined that a master ATCF is unavailable, send an allocated STN-SR to an SCC AS; the SCC AS 54 is connected to the above-mentioned ATCF 52 and is configured to send an ATU-STI and a C-MSISDN to the slave ATCF according to the above-mentioned STN-SR; and the above-mentioned slave ATCF 52 is further configured to continue a service according to the STN-SR, the ATU-STI, and the C-MSISDN.

Figure 6:
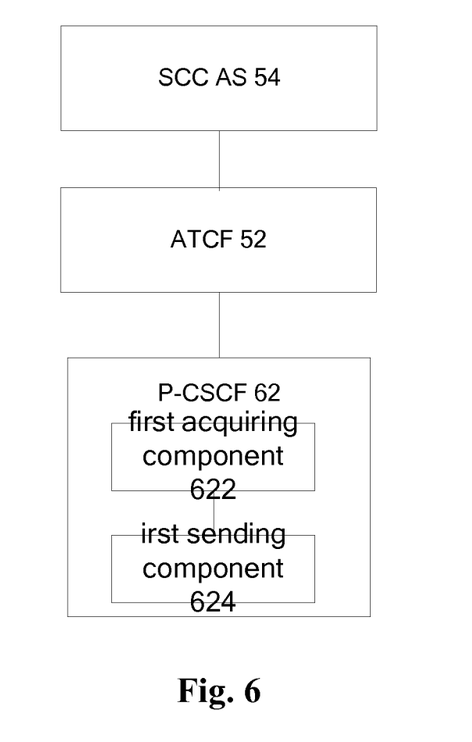
FIG. 6 shows a preferred structure diagram one of a system for processing service continuity according to an embodiment of the disclosure.

FIG. 6 shows a preferred structure diagram one of a system for processing service continuity according to an embodiment of the disclosure. As shown in FIG. 6, besides all the structures shown in FIG. 5, the system further includes a P-CSCF 62. The P-CSCF 62 is connected to the above-mentioned slave ATCF 52 and includes a first acquiring component 622 and a first sending component 624, and the P-CSCF 62 is described below.

The first acquiring component 622 is configured to, after it is determined that the master ATCF of a service route which is registered and returned previously is unavailable, acquire an address of the slave ATCF by means of querying a DNS or according to local configuration; and the first sending component 624 is connected to the above-mentioned first acquiring component 622 and is configured to send a first request message to the slave ATCF according to the address of the slave ATCF, wherein as an alternative configuration, the P-CSCF extends a disaster recovery indication in the first request message; and/or, a route header of the first request message carries a host name or address of an S-CSCF.

Figure 7:
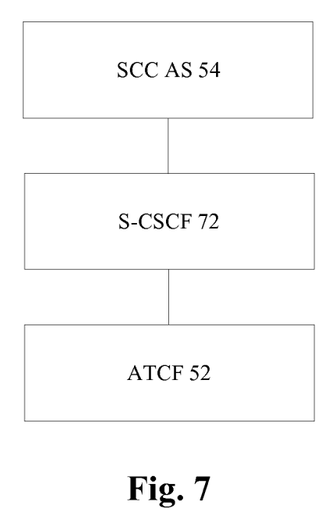
FIG. 7 shows a preferred structure diagram two of a system for processing service continuity according to an embodiment of the disclosure.

FIG. 7 shows a preferred structure diagram two of a system for processing service continuity according to an embodiment of the disclosure. As shown in FIG. 7, besides all the structures shown in FIG. 5, the system further includes an S-CSCF 72. The S-CSCF 72 is connected to the above-mentioned slave ATCF 52 and the preferred structure is described below.

The above-mentioned slave ATCF 52 is further configured to send a message carrying the STN-SR to an S-CSCF; and the above-mentioned S-CSCF 72 is configured to send the received message carrying the STN-SR to the SCC AS.

Figure 8:
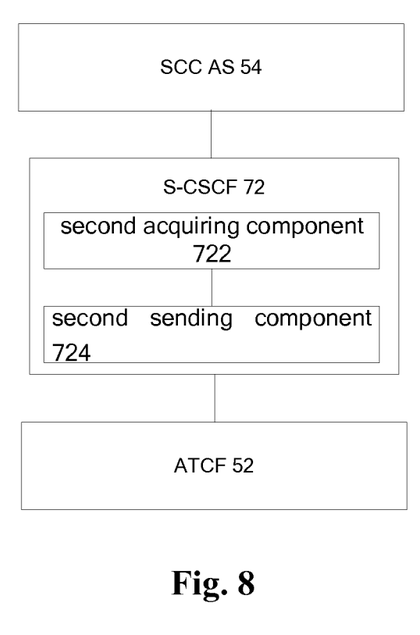
FIG. 8 shows a preferred structure diagram three of a system for processing service continuity according to an embodiment of the disclosure.

FIG. 8 shows a preferred structure diagram three of a system for processing service continuity according to an embodiment of the disclosure. As shown in FIG. 8, besides all the structures shown in FIG. 5, the system further includes an S-CSCF 72. The S-CSCF 72 is connected to the above-mentioned slave ATCF 52 and includes a second acquiring component 722 and a second sending component 724, and the S-CSCF 72 is described below.

The second acquiring component 722 is configured to, after it is determined that the master ATCF is unavailable via link detection, acquire an address of the slave ATCF by querying a DNS or according to local configuration; and the second sending component 724 is connected to the above-mentioned second acquiring component 722 and is configured to send a second request message to the slave ATCF according to the address of the slave ATCF, wherein as an alternative configuration, the S-CSCF extends a disaster recovery indication in the second request message; and/or, a route header of the second request message carries a host name or address of a P-CSCF.

Figure 9:
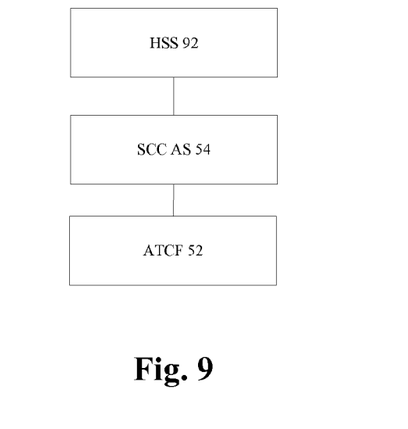
FIG. 9 shows a preferred structure diagram four of a system for processing service continuity according to an embodiment of the disclosure.

FIG. 9 shows a preferred structure diagram four of a system for processing service continuity according to an embodiment of the disclosure. As shown in FIG. 9, besides all the structures shown in FIG. 5, the system further includes the above-mentioned SCC AS 54 and an HSS 92 and the preferred structure is described below.

The SCC AS 54 is further configured to initiate an STN-SR update to the HSS 92; and the above-mentioned HSS 92 is connected to the above-mentioned SCC AS 54 and is configured to initiate the STN-SR update to an MME.

The standard released in the 3GPP in the related art describe the processes of the registration and call in a PS domain and the switch from the PS domain to a CS domain of a UE, but does not state a call processing flow after a master network element is breakdown. Although the subscriber has already registered previously, when the master network element is breakdown, according to the normal flow stipulated by the standard, a slave network element provides a service only after the UE re-registers. However, when the slave network element conducts the re-registration of the UE, the time of service interruption will be long, and the specific duration depends on the settings on the UE. The UE will not be able to conduct call-out, call-in and call anchoring, let alone call switch for several minutes to tens of minutes. In view of the above-mentioned problem, an eSRVCC technology referring to an IMS network is provided in the present embodiment. The processing technology provides for the call and switch services before the master ATCF network element is breakdown and the UE re-registers.

The main core concept of the present embodiment is that when the master ATCF network element serving for the UE is breakdown, before the UE re-registers, although there is no relevant information (for example, a host name or address of the S-CSCF, the ATU-STI, and the C-MSISDN, etc.) about the registration of the subscriber at the moment on the slave ATCF network element taken over by the disaster recovery, the slave ATCF can deal with the services related to the UE so as to reduce the service interruption duration caused by a network side.

After the ATCF network element is breakdown, before the UE re-registers, as regards an incoming/outgoing call, the ATCF network element taken over by the disaster recovery executes an opening flow and anchors the call and the media.

The processing technology adopted by the embodiments of the disclosure is illustrated below:

As regards the P-CSCF, at first in a P-CSCF side, the P-CSCF finds that the master ATCF of a service route which is registered and returned previously is unavailable, and acquires an address of the ATCF network element taken over by the disaster recovery by querying a DNS or according to a local configuration. As an alternative configuration, a disaster recovery indication is extended in a call request message; and the P-CSCF can also carry a host name or address of the S-CSCF on a route header. The P-CSCF sends a call request (i.e. the first request message in the above-mentioned embodiment or preferred embodiment) to the ATCF taken over by the disaster recovery. The ATCF finds that there is no UE registration information locally or according to the disaster recovery indication extended by the P-CSCF in the message, the ATCF acquires an address of the I-CSCF by using a subscriber domain name to query a DNS or according to the local configuration and sends a call to the I-CSCF; since the UE has already registered previously, the I-CSCF can acquire the S-CSCF serving for the subscriber by querying the HSS and then sends the call to the S-CSCF, and the follow-up flow is the same as the normal process; and the ATCF can also directly send the call to the S-CSCF according to second route information sent from the P-CSCF.

As regards the S-CSCF, the S-CSCF will firstly acquire the addresses of the master ATCF and the P-CSCF as a Route according to a path in the registered information about the subscriber; and a contact address is acquired as a Request URI according to a Contact in the registered information. The S-CSCF finds that the master ATCF is unavailable via link detection, and then acquires the address of the slave ATCF network element taken over by the disaster recovery by querying the DNS or according to the local configuration; and when it is found available, the call is sent to the slave ATCF taken over by the disaster recovery. As an alternative configuration, the S-CSCF can carry the extended disaster recovery indication when sending the call. The ATCF acquires the address of the P-CSCF according to a Route header indication in the call request message and sends the call to the P-CSCF.

After the ATCF network element is breakdown, before the UE re-registers, and when there is an incoming/outgoing call, the ATCF taken over by the disaster recovery sends the STN-SR allocated by itself to the SCC AS via the extended call request or a response message; the SCC AS updates the HSS and then notifies the MME and an MSC server; the SCC AS notifies the ATCF of the ATU-STI and the C-MSISDN via the extended request or response message; and the SCC AS can also notify the ATCF of the ATU-STI and the C-MSISDN via other messages such as a Message. There is no time sequence requirements between the process of the SCC AS updating the HSS and the process of notifying the ATCF, and the two processes can be conducted simultaneously.

Subsequently, if there is an SRVCC switch process, the MSC server routes the switch request to the ATCF network element taken over by the disaster recovery according to the updated STN-SR, and the ATCF network element executes the switch flow.

By virtue of the above-mentioned embodiments and preferred embodiments, during the period after the master ATCF network element is breakdown and before the UE re-registers, the ATCF network element taken over by the disaster recovery can still provide the following services for the UE: the UE can still call out or call in; and the ATCF and the relevant network elements can still conduct call anchoring and the call switch from the PS domain to the CS domain. Thus, in the case that a network side device is breakdown and the user data is lost, when the subscriber initiates a service request or there is a service call-terminal request pointing to the subscriber at the moment, the subscriber can still be provided with normal services, ensuring avoiding the case that the subscriber service cannot be provided. It should be noted that, it is assumed that the UE has registered successfully through a P-CSCF-ATCF1-I-CSCF-S-CSCF-SCC AS path, wherein the flow is a standard flow with reference to the 3GPP TS 24.237.

Figure 10:
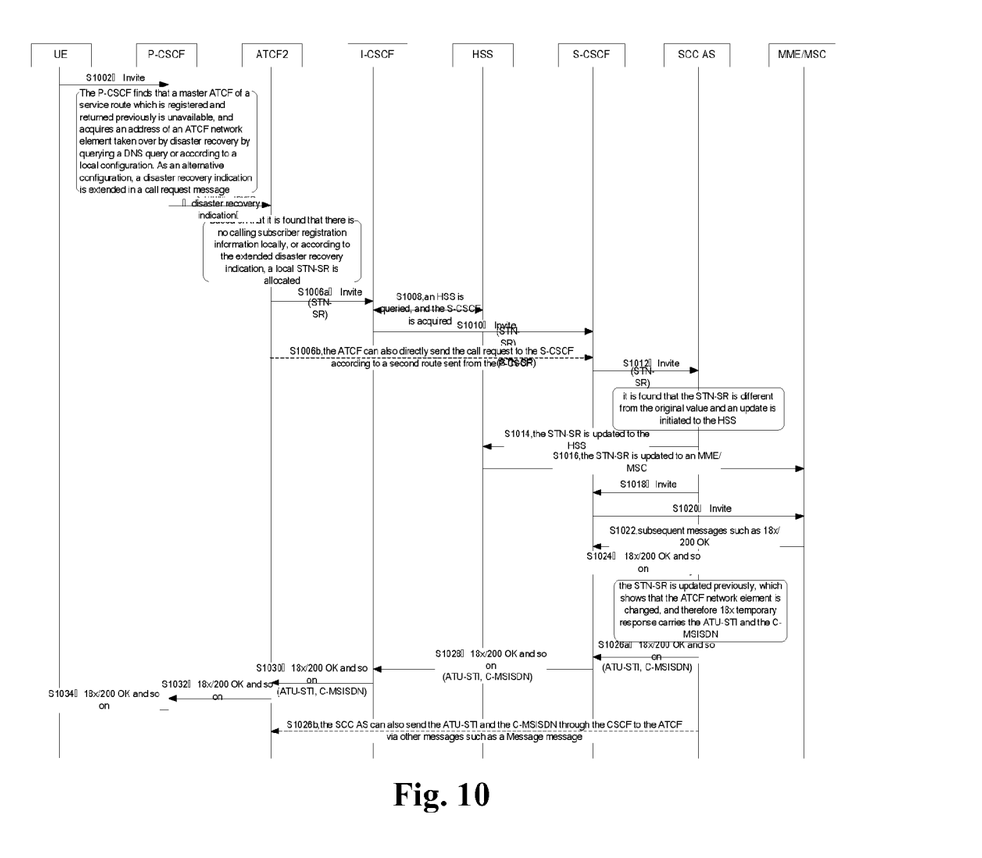
FIG. 10 shows a flowchart that a UE initiates a call after the disaster recovery of a master ATCF according to an embodiment of the disclosure.

FIG. 10 shows a flowchart that a UE initiates a call after the disaster recovery of a master ATCF according to an embodiment of the disclosure. As shown in FIG. 10, the flow comprises the following steps:

Step S1002, a UE initiates a call and sends an Invite call request message to a P-CSCF.

Step S1004, the P-CSCF finds that a master ATCF of the service route which is registered and returned previously is unavailable, and acquires an address of an ATCF network element taken over by disaster recovery querying a DNS or according to a local configuration. As an alternative configuration, a disaster recovery indication is extended in a call request message; and meanwhile, the P-CSCF can also carry a host name or address of an S-CSCF registered previously by the subscriber on a route header.

Step S1006a, an ATCF2 (refers to the above slave ATCF) finds that there is no local calling subscriber registration information, or judges that it is a passed call due to the disaster recovery according to the extended disaster recovery indication. The ATCF acquires an I-CSCF address of a home domain by querying a DNS or according to a local configuration, and allocates an STN-SR, extends an SIP message, writes the STN-SR into the extension field and sends the Invite call request to the I-CSCF.

Step S1006b, the ATCF can also directly send the call to the S-CSCF according to second route information sent from the P-CSCF, wherein the call carries the STN-SR. The follow-up flow skips step S1008 and step S1010.

Step S1008, the I-CSCF queries an HSS to acquire the allocated serving S-CSCF.

Step S1010, the I-CSCF sends the Invite call request to the S-CSCF, wherein the Invite call request carries the STN-SR.

Step S1012, the S-CSCF triggers the Invite call request to the SCC AS according to an initial filter rule, wherein the Invite call request carries the STN-SR.

Step S1014, the SCC AS receives the Invite call request, and finds that the carried STN-SR is different from the original value and uses a new STN-SR value to initiate an update to the HSS.

Step S1016, the HSS initiates the update of the STN-SR to an MME, and then the MME updates an MSC server.

Steps S1018-S1020, the SCC AS removes the extended portion in the Invite call request, and continues continuing the call, which is the same as a standard flow. There is no time sequence requirements between step S1018 and step S1014, and the two steps can be conducted simultaneously.

Step S1022, the S-CSCF receives subsequent messages sent subsequently such as 18x/200 OK.

Step S1024, the S-CSCF sends the subsequent messages such as 18x/200 OK to the SCC AS.

Step S1026a, the SCC AS finds that the STN-SR of this call has been updated, which shows that the ATCF network element is changed, and therefore extends the SIP message, and fills an ATU-STI and a C-MSISDN into the extension field of the subsequent messages such as 18x/200 OK to send to the S-CSCF.

Step S1026b, as a network option, the SCC AS can also notify the ATCF of the ATU-STI and the C-MSISDN via other messages such as Message. Through the way, it does not need to extend the SIP message to carry the ATU-STI and the C-MSISDN in Step S1026a. There is no time sequence requirements between step S1026b and step S1014, and the two steps can be conducted simultaneously.

Step S1028, the S-CSCF sends the subsequent messages such as 18x/200 OK to the I-CSCF, wherein the subsequent message carries the ATU-STI and the C-MSISDN.

Step S1030, the I-CSCF sends the subsequent messages such as 18x/200 OK to the ATCF2, wherein the subsequent message carries the ATU-STI and the C-MSISDN.

Step S1032, the ATCF2 receives the subsequent messages such as 18x/200 OK, saves the ATU-STI and the C-MSISDN. The extended portion is removed, and the subsequent messages such as 18x/200 OK are sent to the P-CSCF.

Step S1034, the P-CSCF sends the 18x response message to the UE.

The follow-up flow is the same as the standard flow, which is omitted here.

Figure 11:
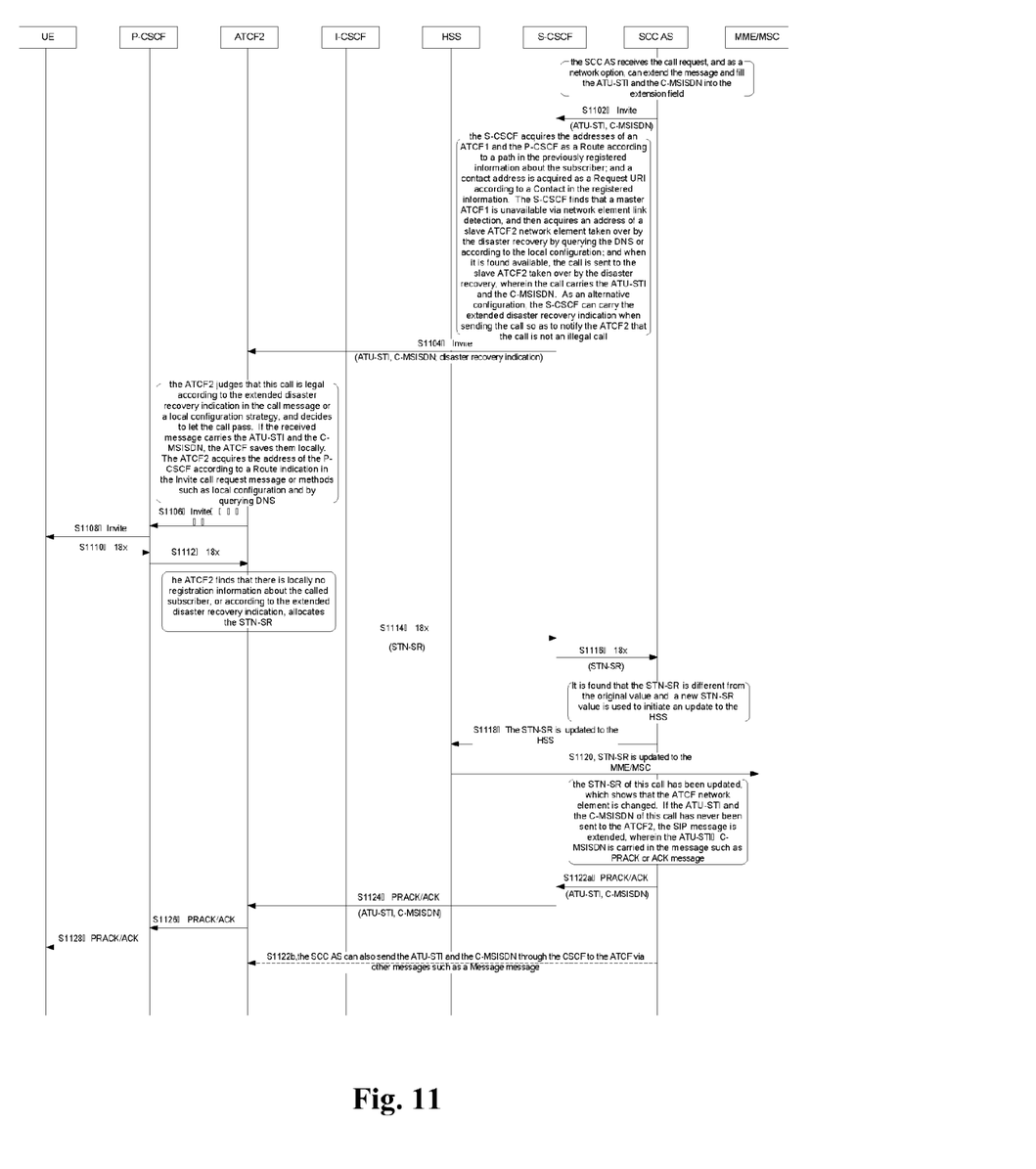
FIG. 11 shows a flowchart that a UE receives a call after the disaster recovery of a master ATCF according to an embodiment of the disclosure.

FIG. 11 shows a flowchart that a UE receives a call after the disaster recovery of a master ATCF according to an embodiment of the disclosure. As shown in FIG. 11, the flow comprises the following steps:

Step S1102, the SCC AS receives the call request, and according to an alternative configuration of an SCC AS network element, can extend the message, fill the ATU-STI and the C-MSISDN into the extension field and send the Invite call request to the S-CSCF.

Step S1104, the S-CSCF acquires the addresses of an ATCF1 and the P-CSCF as a Route according to a path in the previously registered information about the subscriber; and a contact address is acquired as a Request URI according to a Contact in the registered information. The S-CSCF finds that a master ATCF1 is unavailable via network element link detection, and then acquires an address of a slave ATCF2 network element taken over by the disaster recovery by querying the DNS or according to the local configuration; and when it is found available, the call is sent to the slave ATCF2 taken over by the disaster recovery, wherein the call carries the ATU-STI and the C-MSISDN. As an alternative configuration, the S-CSCF can carry the extended disaster recovery indication when sending the call so as to notify the ATCF2 that the call is not an illegal call.

Step S1106, the ATCF2 judges that this call is legal according to the extended disaster recovery indication in the call message or a local configuration strategy, and decides to let the call pass. If the received message carries the ATU-STI and the C-MSISDN, the ATCF saves them locally. The ATCF2 acquires the address of the P-CSCF according to a Route indication in the Invite call request message or methods such as local configuration and by querying DNS and sends the call to the P-CSCF.

Step S1108, the P-CSCF sends the Invite call request to the UE.

Step S1110, the UE sends messages such as 18x to the P-CSCF.

Step S1112, the P-CSCF sends the messages such as 18x to the ATCF2.

Step S1114, the ATCF2 finds that there is locally no registration information about the called subscriber, or according to the extended disaster recovery indication, allocates the STN-SR, extends the SIP message and writes the STN-SR into the extension field and sends the messages such as 18x to the S-CSCF. The ATCF2 can also extend a field in messages such as 200 OK, wherein the message carries the STN-SR.

Step S1116, the S-CSCF sends the messages such as 18x to the SCC AS, wherein the message carries the STN-SR.

Step S1118, the SCC AS receives the messages such as 18x, and finds that the STN-SR is different from the original value and uses a new STN-SR value to initiate an update to the HSS.

Step S1120, the HSS initiates the update of the STN-SR to the MME, and then the MME updates the MSC server.

Step S1122a, the SCC AS finds that the STN-SR of this call has been updated, which shows that the ATCF network element is changed. If the ATU-STI and the C-MSISDN of this call has never been sent to the ATCF2, the SIP message is extended and the ATU-STI and the C-MSISDN are filled into the extension field of the messages such as PRACK. If there is no subsequent PRACK message, the ATU-STI and the C-MSISDN are filled into the extension field of the subsequent messages such as ACK. The messages such as PRACK/ACK are sent to the S-CSCF. There is no time sequence requirements between step S1122a and step S1118, and the two steps can be conducted simultaneously.

Step S1122b, as a network option, the SCC AS can also notify the ATCF2 of the ATU-STI and the C-MSISDN via other messages such as Message. Through this way, it does not need to extend the SIP message to carry the ATU-STI and the C-MSISDN in Step S1122a. There is no time sequence requirements between step S1122b and step S1118, and the two steps can be conducted simultaneously.

Step S1124, the S-CSCF sends the messages such as PRACK/ACK to the ATCF2, wherein the messages carries the ATU-STI and the C-MSISDN.

Step S1126, the ATCF2 receives the messages such as PRACK/ACK, saves the ATU-STI and the C-MSISDN. The extended portion is removed, and the messages such as PRACK/ACK are sent to the P-CSCF.

Step S1128, the P-CSCF sends the messages such as PRACK/ACK to the UE.

The follow-up flow is the same as the standard flow, which is omitted here.

Figure 12:
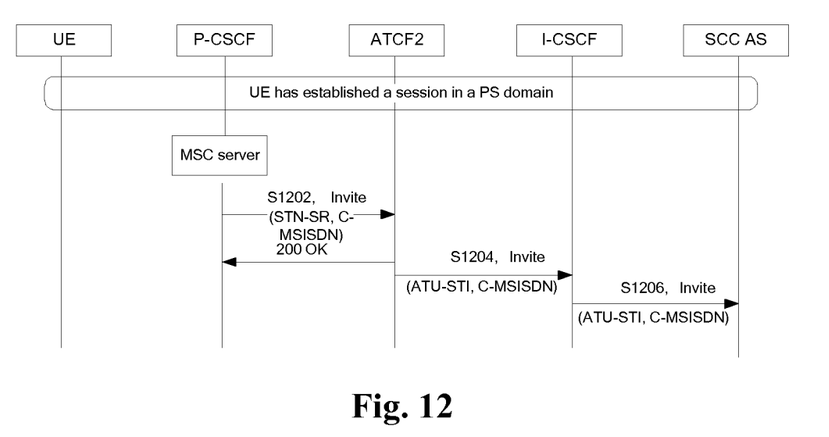
FIG. 12 shows a flowchart of a call transfer of a UE from a PS domain to a CS domain after the disaster recovery of a master ATCF according to an embodiment of the disclosure.

FIG. 12 shows a flowchart of a call switch of a UE from a PS domain to a CS domain after the disaster recovery of a master ATCF according to an embodiment of the disclosure. As shown in FIG. 12, the flow comprises the following steps:

Step S1202, the UE has established a session in a PS domain and has moved to a CS domain. The MSC server initiates an Invite switch request, and according to the updated STN-SR, sends the request to the ATCF2, wherein the request carries the C-MSISDN of the UE.

Step S1204, the ATCF2 receives the Invite switch request, finds out the call anchored by the UE in the PS domain according to the C-MSISDN, fills the ATU-STI and the C-MSISDN into the switch request, and initiates a new Invite request to the I-CSCF.

Step S1206, the I-CSCF sends the Invite switch request to the SCC AS, wherein the Invite switch request carries the ATU-STI and the C-MSISDN.

The follow-up flow is the same as the standard flow, which is omitted here.

It should be noted that the flows in the embodiments are schematic flows. The method for networking and implementing the network element in the embodiments is merely a specific example and all other ways embodying the core concept of the disclosure fall within the scope claimed by the present patent. The messages among all the network elements in the embodiments are mainly for clearly showing the acquisition of access network switch information and the concept of call switch. It is not limited to these network elements and messages in concrete implementation. The abnormal conditions in various flows, the sequence of certain messages in a possible case and the concrete implementation inside the network elements are not specifically limited. In addition, the ATCF and other network elements (e.g. P-CSCF) can both be combined and be separated in the implementation.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection of the disclosure.

What is claimed is:

1. A method for processing service continuity, comprising:
   determining, by a slave Access Transfer Control Function (ATCF), that a master ATCF is unavailable;
   sending, by the salve ATCF, an allocated Session Transfer Number-Single Radio (STN-SR) to a Service Continuity and Centralization Application Server (SCC AS);
   sending, by the SCC AS, an Access Transfer Update-Session Transfer Identifier (ATU-STI) and a Correlation-Mobile Subscriber International Intergrated Service Digital Network (ISDN) Number (C-MSISDN) to the slave ATCF according to the STN-SR; and
   continuing, by the slave ATCF, a service according to the STN-SR, the ATU-STI, and the C-MSISDN;
   wherein sending, by the slave ATCF, the allocated STN-SR to the SCC AS comprises:
   sending, by the slave ATCF, a message carrying the STN-SR to a Serving Call Session Control Function (S-CSCF); and
   sending, by the S-CSCF, the received message carrying the STN-SR to the SCC AS.

2. The method according to claim 1, wherein before determining, by the slave ATCF, that the master ATCF is unavailable, further comprising:
   after a Proxy Call Session Control Function (P-CSCF) determines that the master ATCF of a service route which is registered and returned previously is unavailable, acquiring an address of the slave ATCF by means of querying Domain Name System (DNS) or local configuration; and
   sending, by the P-CSCF, a first request message to the slave ATCF according to the address of the slave ATCF, wherein as an alternative configuration, the P-CSCF extends a disaster recovery indication in the first request message; and/or, a route header of the first request message carries a host name or address of a Serving Call Session Control Function (S-CSCF).

3. The method according to claim 2, wherein continuing, by the slave ATCF, a service according to the STN-SR, the ATU-STI, and the C-MSISDN comprises at least one of the following:
   continuing, by the slave ATCF, a service that a User Equipment (UE) initiates a call according to the STN-SR, the ATU-STI, and the C-MSISDN;
   continuing, by the slave ATCF, a service that the UE receives a call according to the STN-SR, the ATU-STI, and the C-MSISDN; and
   continuing, by the slave ATCF, a service that the UE performs call switching according to the STN-SR, the ATU-STI, and the C-MSISDN parameters.

4. The method according to claim 1, wherein determining, by the slave ATCF, that the master ATCF is unavailable by at least one of the following means:
   determining, by the slave ATCF, that the master ATCF is unavailable according to a case that there is no registration information of a current subscriber locally; and
   determining, by the slave ATCF, that the master ATCF is unavailable according to received disaster recovery indication information.

5. The method according to claim 4, wherein continuing, by the slave ATCF, a service according to the STN-SR, the ATU-STI, and the C-MSISDN comprises at least one of the following:
   continuing, by the slave ATCF, a service that a User Equipment (UE) initiates a call according to the STN-SR, the ATU-STI, and the C-MSISDN;
   continuing, by the slave ATCF, a service that the UE receives a call according to the STN-SR, the ATU-STI, and the C-MSISDN; and
   continuing, by the slave ATCF, a service that the UE performs call switching according to the STN-SR, the ATU-STI, and the C-MSISDN parameters.

6. The method according to claim 1, wherein sending, by the slave ATCF, the message carrying the STN-SR to the S-CSCF comprises:
   sending, by the slave ATCF, an extended first Session Initiation Protocol SIP message to an Interrogating-Call Session Control Function (I-CSCF), wherein an extension field of the extended first SIP message carries the STN-SR; the I-CSCF queries a Home Subscriber Server (HSS) to acquire the S-CSCF; and the I-CSCF sends the first SIP message carrying the STN-SR to the S-CSCF; or
   sending, by the slave ATCF, a first SIP message from a Proxy Call Session Control Function (P-CSCF) to the S-CSCF, wherein the first SIP message carries the STN-SR, and a route header of the first SIP message carries a host name or address of the S-CSCF.

7. The method according to claim 6, wherein continuing, by the slave ATCF, a service according to the STN-SR, the ATU-STI, and the C-MSISDN comprises at least one of the following:
   continuing, by the slave ATCF, a service that a User Equipment (UE) initiates a call according to the STN-SR, the ATU-STI, and the C-MSISDN;
   continuing, by the slave ATCF, a service that the UE receives a call according to the STN-SR, the ATU-STI, and the C-MSISDN; and
   continuing, by the slave ATCF, a service that the UE performs call switching according to the STN-SR, the ATU-STI, and the C-MSISDN parameters.

8. The method according to claim 1, wherein before determining, by the slave ATCF, that the master ATCF is unavailable, further comprising:

after a Serving Call Session Control Function (S-CSCF) determines that the master ATCF is unavailable via link detection, acquiring an address of the slave ATCF by querying a Domain Name System (DNS) or according to a local configuration; and sending, by the S-CSCF, a second request message to the slave ATCF according to the address of the slave ATCF, wherein as an alternative configuration, the S-CSCF extends a disaster recovery indication in the second request message; and/or, a router header of the second request message carries a host name or address of a Proxy Call Session Control Function (P-CSCF).

9. The method according to claim 8, wherein continuing, by the slave ATCF, a service according to the STN-SR, the ATU-STI, and the C-MSISDN comprises at least one of the following:

continuing, by the slave ATCF, a service that a User Equipment (UE) initiates a call according to the STN-SR, the ATU-STI, and the C-MSISDN;

continuing, by the slave ATCF, a service that the UE receives a call according to the STN-SR, the ATU-STI, and the C-MSISDN; and continuing, by the slave ATCF, a service that the UE performs call switching according to the STN-SR, the ATU-STI, and the C-MSISDN parameters.

10. The method according to claim 1, wherein before or after sending, by the SCC AS, the ATU-STI and the C-MSISDN to the slave ATCF according to the STN-SR, further comprising:

initiating, by the SCC AS, an STN-SR update to the Home Subscriber Server (HSS); and initiating, by the HSS, the STN-SR update to the Mobile Management Entity (MME).

11. The method according to claim 10, wherein continuing, by the slave ATCF, a service according to the STN-SR, the ATU-STI, and the C-MSISDN comprises at least one of the following:

continuing, by the slave ATCF, a service that a User Equipment (UE) initiates a call according to the STN-SR, the ATU-STI, and the C-MSISDN;

continuing, by the slave ATCF, a service that the UE receives a call according to the STN-SR, the ATU-STI, and the C-MSISDN; and continuing, by the slave ATCF, a service that the UE performs call switching according to the STN-SR, the ATU-STI, and the C-MSISDN parameters.

12. The method according to claim 1, wherein sending, by the SCC AS, the ATU-STI and the C-MSISDN to the slave ATCF according to the STN-SR comprises:

sending, by the SCC AS, an extended second Session Initiation Protocol SIP message to the S-CSCF, wherein the extended second SIP message carries the ATU-STI and the C-MSISDN; or sending, by the SCC AS, the ATU-STI and the C-MSISDN to the S-CSCF via a predefined message.

13. The method according to claim 1, wherein continuing, by the slave ATCF, a service according to the STN-SR, the ATU-STI, and the C-MSISDN comprises at least one of the following:

continuing, by the slave ATCF, a service that a User Equipment (UE) initiates a call according to the STN-SR, the ATU-STI, and the C-MSISDN;

continuing, by the slave ATCF, a service that the UE receives a call according to the STN-SR, the ATU-STI, and the C-MSISDN; and continuing, by the slave ATCF, a service that the UE performs call switching according to the STN-SR, the ATU-STI, and the C-MSISDN parameters.

14. The method according to claim 1, wherein continuing, by the slave ATCF, a service according to the STN-SR, the ATU-STI, and the C-MSISDN comprises at least one of the following:

continuing, by the slave ATCF, a service that a User Equipment (UE) initiates a call according to the STN-SR, the ATU-STI, and the C-MSISDN;

continuing, by the slave ATCF, a service that the UE receives a call according to the STN-SR, the ATU-STI, and the C-MSISDN; and continuing, by the slave ATCF, a service that the UE performs call switching according to the STN-SR, the ATU-STI, and the C-MSISDN parameters.

15. A system for processing service continuity, characterized by comprising:

a slave Access Transfer Control Function (ATCF), configured to, after it is determined that a master ATCF is unavailable, send an allocated Session Transfer Number-Single Radio (STN-SR) to a Service Continuity and Centralization Application Server (SCC AS);

the SCC AS, configured to send an Access Transfer Update-Session Transfer Identifier (ATU-STI) and a Correlation-Mobile Subscriber International Intergrated Service Digital Network (ISDN) number (C-MSISDN) to the slave ATCF according to the STN-SR; and the slave ATCF, further configured to continue a service according to the STN-SR, the ATU-STI, and the C-MSISDN;

wherein the system further comprises:

the slave ATCF, further configured to send a message carrying the STN-SR to a Serving Call Session Control Function (S-CSCF); and the S-CSCF, configured to send the received message carrying the STN-SR to the SCC AS.

16. The system according to claim 15, wherein the system further comprises a Proxy Call Session Control Function (P-CSCF) and the P-CSCF comprises a first acquiring component and a first sending component:

the first acquiring component, configured to, after it is determined that the master ATCF of a service route which is registered and returned previously is unavailable, acquire an address of the slave ATCF by means of querying Domain Name System (DNS) or local configuration; and the first sending component, configured to send a first request message to the slave ATCF according to the address of the slave ATCF, wherein as an alternative configuration, the P-CSCF extends a disaster recovery indication in the first request message; and/or, a route header of the first request message carries a host name or address of a Serving Call Session Control Function (S-CSCF).

17. The system according to claim 15, wherein the system further comprises a Serving Call Session Control Function (S-CSCF) and the S-CSCF comprises a second acquiring component and a second sending component:

the second acquiring component, configured to, after it is determined that the master ATCF is unavailable via link detection, acquire an address of the slave ATCF by querying a Domain Name System (DNS) or according to a local configuration; and the second sending component, configured to send a second request message to the slave ATCF according to the address of the slave ATCF, wherein as an alternative configuration, the S-CSCF extends a disaster recovery indication in the second request message; and/or, a route header of the second request message carries a host name or address of a Proxy Call Session Control Function (P-CSCF).

18. The system according to claim 15, wherein the system further comprises:
the SCC AS, further configured to initiate an STN-SR update to the Home Subscriber Server (HSS); and
the HSS, configured to initiate the STN-SR update to the Mobile Management Entity (MME).

* * * * *